United States Patent
Bookbinder et al.

(10) Patent No.: US 10,215,915 B2
(45) Date of Patent: Feb. 26, 2019

(54) LOW BEND LOSS SINGLE MODE OPTICAL FIBER WITH BROMINE UP-DOPED CLADDING

(71) Applicant: Corning Incorporated, Corning, NY (US)

(72) Inventors: Dana Craig Bookbinder, Corning, NY (US); Steven Bruce Dawes, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/714,122

(22) Filed: Sep. 25, 2017

(65) Prior Publication Data
US 2018/0095219 A1    Apr. 5, 2018

Related U.S. Application Data

(60) Provisional application No. 62/402,283, filed on Sep. 30, 2016.

(51) Int. Cl.
| | | |
|---|---|---|
| G02B 6/28 | (2006.01) |
| C03B 37/014 | (2006.01) |
| G02B 6/028 | (2006.01) |
| G02B 6/02 | (2006.01) |
| G02B 6/036 | (2006.01) |
| C03C 3/06 | (2006.01) |

(52) U.S. Cl.
CPC ......... *G02B 6/0286* (2013.01); *C03B 37/014* (2013.01); *C03C 3/06* (2013.01);
(Continued)

(58) Field of Classification Search
None
See application file for complete search history.

(56) References Cited

U.S. PATENT DOCUMENTS

| | | |
|---|---|---|
| 5,410,567 A | 4/1995 | Brundage et al. |
| 5,486,947 A | 1/1996 | Ohishi et al. |

(Continued)

OTHER PUBLICATIONS

International Search Report and Written Opinion PCT/US2017/052687 dated Dec. 1, 2017.
(Continued)

*Primary Examiner* — Sung H Pak
(74) *Attorney, Agent, or Firm* — Robert L. Carlson

(57) ABSTRACT

According to embodiments, an optical fiber may include a core portion comprising an outer radius $r_C$ and a maximum relative refractive index $\Delta_{Cmax}$. A cladding may surround the core portion and include a low-index trench and an outer cladding. The low index trench may surround the core portion and includes an outer radius $r_T$ and relative refractive index $\Delta_T$. The outer cladding may surround and be in direct contact with the low-index trench. The outer cladding may be formed from silica-based glass comprising greater than 1.0 wt. % bromine and has a relative refractive index $\Delta_{OC}$, wherein $\Delta_{Cmax} > \Delta_{OC} > \Delta_T$. The optical fiber may have a cable cutoff of less than or equal to 1530 nm. An attenuation of the optical fiber may be less than or equal to 0.185 dB/km at a wavelength of 1550 nm.

26 Claims, 4 Drawing Sheets

(52) U.S. Cl.
CPC ..... *G02B 6/02004* (2013.01); *G02B 6/02319* (2013.01); *G02B 6/02395* (2013.01); *G02B 6/0365* (2013.01); *G02B 6/03611* (2013.01); *G02B 6/03616* (2013.01); *G02B 6/03627* (2013.01); *C03B 2201/20* (2013.01); *C03B 2201/28* (2013.01); *C03B 2201/31* (2013.01); *C03B 2201/36* (2013.01); *C03B 2201/42* (2013.01); *C03B 2203/22* (2013.01); *C03B 2203/24* (2013.01); *C03C 2201/02* (2013.01); *C03C 2201/08* (2013.01); *G02B 6/02009* (2013.01); *G02B 6/0281* (2013.01); *G02B 6/03694* (2013.01)

(56) References Cited

U.S. PATENT DOCUMENTS

| | | |
|---|---|---|
| 6,027,062 A | 2/2000 | Bacon et al. |
| 7,565,820 B2 | 7/2009 | Foster et al. |
| 7,715,675 B2 * | 5/2010 | Fabian ................ C03C 25/1065 385/100 |
| 7,832,675 B2 | 11/2010 | Bumgarner et al. |
| 8,891,925 B2 * | 11/2014 | Bickham ............ G02B 6/02395 385/127 |
| 9,798,079 B2 | 10/2017 | Bookbinder et al. |
| 2006/0130529 A1 | 6/2006 | Bookbinder et al. |
| 2014/0301708 A1 | 10/2014 | Mishra et al. |
| 2014/0308015 A1 | 10/2014 | Bookbinder et al. |
| 2017/0176673 A1 | 6/2017 | Berkey et al. |
| 2017/0285260 A1 | 10/2017 | Bookbinder et al. |

OTHER PUBLICATIONS

Single Mode Fiber Optics, Jeunhomme, pp. 39 44, Marcel Dekker, New York, 1990.

* cited by examiner

LOW BEND LOSS SINGLE MODE OPTICAL FIBER WITH BROMINE UP-DOPED CLADDING This application claims the benefit of priority under 35 U.S.C. § 119 of U.S. Provisional Application Ser. No. 62/402,283 filed on Sep. 30, 2016 the content of which is relied upon and incorporated herein by reference in its entirety.

BACKGROUND

Field

The present specification generally relates to optical fibers with low bend losses and, more specifically, to single mode optical fibers with low bend losses.

Technical Background

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables.

SUMMARY

According to embodiments, an optical fiber may include a core portion comprising an outer radius $r_C$ and a maximum relative refractive index $\Delta_{Cmax}$. A cladding may surround the core portion and include a low-index trench and an outer cladding. The low index trench may surround the core portion and includes an outer radius $r_T$ and relative refractive index $\Delta_T$. The outer cladding may surround and be in direct contact with the low-index trench. The outer cladding may be formed from silica-based glass comprising greater than 1.0 wt. % bromine and has a relative refractive index $\Delta_{OC}$, wherein $\Delta_{Cmax} > \Delta_{OC} > \Delta_T$. The optical fiber may have a cable cutoff of less than or equal to 1530 nm. An attenuation of the optical fiber may be less than or equal to 0.185 dB/km at a wavelength of 1550 nm.

According to some other embodiments, an optical fiber may include a core portion comprising an outer radius $r_C$ and a maximum relative refractive index $\Delta_{Cmax}$. A cladding may surround the core portion. The cladding may include a low-index trench and an outer cladding. The low-index trench may surround the core portion and has an outer radius $r_T$ and relative refractive index $\Delta_T$ relative to pure silica glass. The outer cladding may surround and be in direct contact with the low-index trench. The outer cladding may be formed from silica-based glass comprising greater than 0.25 wt. % of bromine or a compound of bromine and having a relative refractive index $\Delta_{OC}$ relative to pure silica glass, wherein $\Delta_{Cmax} > \Delta_{OC} > \Delta_T$. The optical fiber may have a cable cutoff less than or equal to 1530 nm. An axial stress of a region directly adjacent to the core portion is less than 2.5 MPa.

Additional features and advantages of the optical fibers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
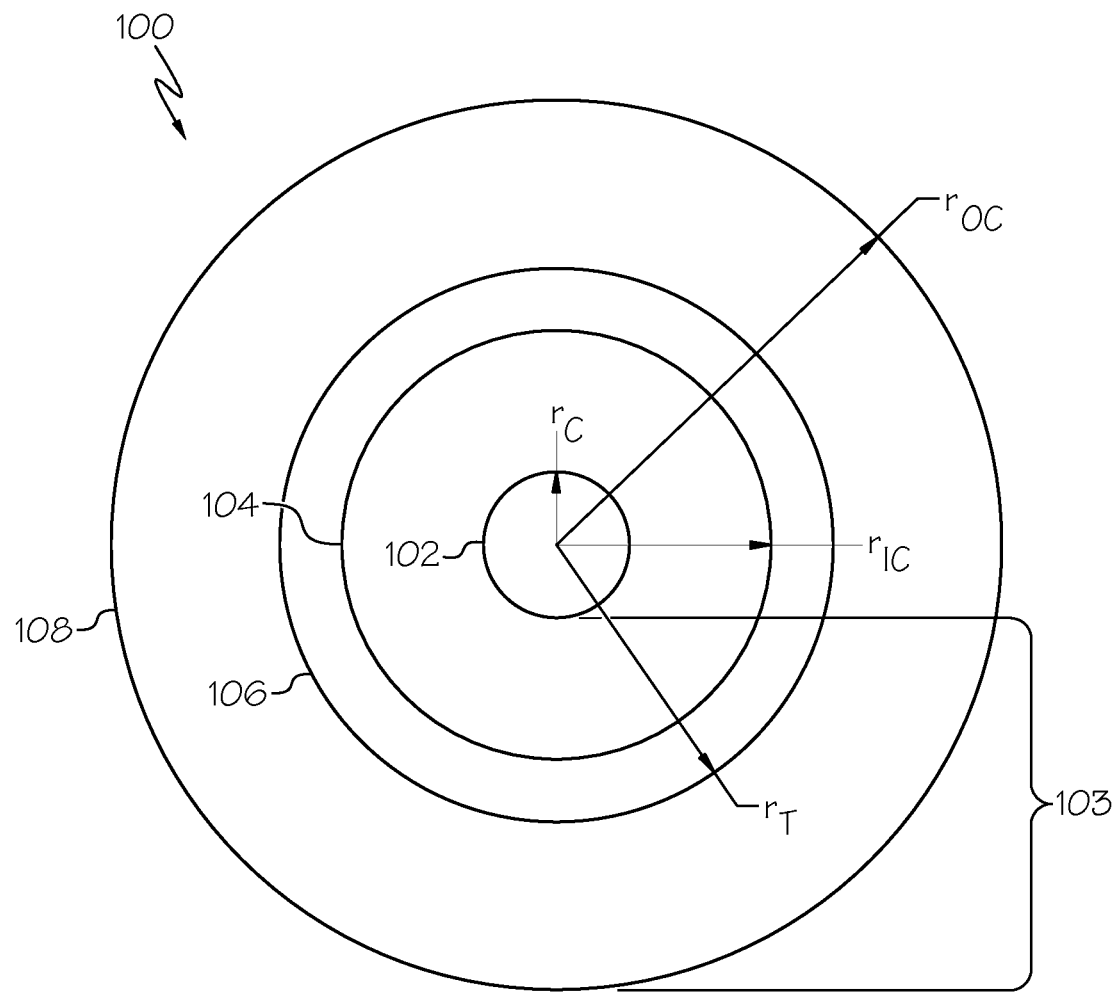
FIG. 1 schematically depicts a radial cross section of an optical fiber according to one or more embodiments shown and described herein.

Reference will now be made in detail to various embodiments of the single mode optical fibers described herein, examples of which are schematically depicted in the accompanying drawings. Whenever possible, the same reference numerals will be used throughout the drawings to refer to the same or like parts. A radial cross section of one embodiment of a single mode optical fiber is schematically depicted in FIG. 1. The optical fiber may include a core portion comprising an outer radius $r_C$ and a maximum relative refractive index $\Delta_{Cmax}$ relative to pure silica glass. A cladding surrounds the core portion and may include a low index trench and an outer cladding. The low-index trench surrounds the core portion, and has an outer trench radius $r_T$ and relative refractive index $\Delta_T$ relative to pure silica glass. The outer cladding surrounds and is in direct contact with the low-index trench. The outer cladding may be formed from silica-based glass that is up-doped with bromine and has a relative refractive index $\Delta_{OC}$ relative to pure silica glass. In one embodiment, the outer cladding may include greater than 1.0 wt. % bromine. In general, $\Delta_{Cmax} > \Delta_{OC} > \Delta_T$ and the optical fiber is single-moded and has a cable cutoff of less than or equal to 1530 nm. In some embodiments, the optical fiber may further comprise an inner cladding disposed between the low-index trench and the core portion. Various embodiments of single mode optical fibers with bromine up-doped outer claddings will be described herein with specific reference to the appended drawings.

The following terminology will be used in conjunction with the optical fibers described herein:

The term "refractive index profile" or "relative refractive index profile," as used herein, is the relationship between the refractive index or the relative refractive index and the radius R of the fiber.

The term "relative refractive index," as used herein, is defined as:

$$\Delta(r)\% = 100 \times \frac{(n(r)^2 - n_{REF}^2)}{2n(r)^2},$$

where n(r) is the refractive index at radius r of the optical fiber, unless otherwise specified, and r=0 corresponds to the centerline of the fiber. The relative refractive index is defined at 1550 nm unless otherwise specified. In the embodiments described herein, the reference index $n_{REF}$ is the refractive index of pure (i.e., un-doped) silica glass (i.e., $n_{REF}$=1.444374 at a wavelength of 1550 nm). As used herein, the relative refractive index is represented by Δ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "up-dopant," as used herein, refers to a dopant which raises the refractive index of glass relative to pure, un-doped $SiO_2$. The term "down-dopant," as used herein, is a dopant which has a propensity to lower the refractive index of glass relative to pure, un-doped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

The term "α-profile" or "alpha profile," as used herein, refers to a relative refractive index profile, expressed in terms of Δ which is in units of "%," where r is the radius and which follows the equation, $$\Delta = \Delta_{1max}\left[1 - \left(\frac{r}{r_1}\right)^\alpha\right],$$

where $\Delta_{1max}$ is the maximum relative refractive index, $r_1$ is the radius of the core, r is in the range $r_i \leq r \leq r_f$, Δ is as defined above, $r_i$ is the initial point of the α-profile, $r_f$ is the final point of the α-profile, and α is an exponent which is a real number. For a graded index profile, the alpha value is less than 10. The term "parabolic," as used herein, includes substantially parabolically shaped refractive index profiles which may vary slightly from an a value of 2.0 at one or more points in the core, as well as profiles with minor variations and/or a centerline dip.

One measure of the bend performance of the optical fibers described herein is macrobend performance. Macrobend performance is determined according to FOTP-62 (JEC-60793-1-47) by wrapping 2 turns of optical fiber around a 15 mm, 20 mm, and/or a 30 mm diameter mandrel and measuring the increase in attenuation due to the bending using an encircled flux (EF) launch condition (also referred to as a "restricted launch condition"). The encircled flux is measured by launching an overfilled pulse into an input end of a 2 m length of InfiniCor® 50 micron core optical fiber which is deployed with a 1 wrap on a 25 mm diameter mandrel near the midpoint. The output end of the InfiniCor® 50 micron core optical fiber is spliced to the fiber under test, and the measured bend loss is the difference of the attenuation under the prescribed bend condition to the attenuation without the bend.

Another measure of the bend performance of the optical fibers described herein is the pin array bend test which is used to compare the relative resistance of the optical fibers to bending. To perform this test, attenuation is measured for an optical fiber with essentially no induced bending loss. The optical fiber is then woven about the pin array and the attenuation is once again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the optical fiber conform to the portion of the periphery of the pins contacted by the fiber. The test pertains to macro-bend resistance of the optical fiber.

Another type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. The wire mesh is sourced from McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

As used herein, the "effective area" of an optical fiber is the area of the optical fiber in which light is propagated and is defined as:

$$A_{\mathit{eff}} = 2\pi \frac{\left(\int_0^\infty E^2 r\,dr\right)^2}{\int_0^\infty E^4 r\,dr},$$

where E is the electric field associated with light propagated in the fiber and r is the radius of the fiber. The effective area is determined at a wavelength of 1550 nm, unless otherwise specified.

Mode field diameter (MFD) is a measure of the spot size or beam width of light propagating in a single mode fiber. Mode-field diameter is a function of the source wavelength, fiber core radius and fiber refractive index profile. MFD is measured using the Peterman II method where MFD=2w, and $$w^2 = 2 \frac{\int_0^\infty E^2 r\,dr}{\int_0^\infty (dE/dr)^2 r\,dr}$$

where E is the electric field distribution in the fiber and r is the radius of the fiber.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength corresponds to the cutoff wavelength of the LP11 mode. If the operative wavelength is below the cutoff wavelength, multimode operation may take place and the introduction of additional sources of dispersion may limit a fiber's information carrying capacity. A mathematical definition can be found in Single Mode Fiber Optics, Jeunhomme, pp. 39 44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The cabled cutoff wavelength, or "cabled cutoff" can be approximated by the 22 m cabled cutoff test described in EIA-455-170 Cable Cutoff Wavelength of Single-mode Fiber by Transmitted Power, or "FOTP-170". Cable cutoff, as used herein, means the value obtained using the approximated test.

Chromatic dispersion or dispersion of a fiber is the sum of the material dispersion, the waveguide dispersion, and the inter-modal dispersion. In the case of single mode waveguide fibers the inter-modal dispersion is zero. The zero dispersion wavelength is a wavelength at which the dispersion has a value of zero. Dispersion slope is the rate of change of dispersion with respect to wavelength.

Unless otherwise specified herein, measurements of the properties of the optical fiber are taken at an operating wavelength of at least one of 850 nm, 980 nm, 1060 nm, or 1310 nm. Unless otherwise specified herein, optical properties (such as dispersion, dispersion slope, etc.) are reported for the LP01 mode.

The axial stress of portions of the optical fiber are measured using the axial refractive index birefringence technique with a IFA-100 Multiwavelength Refractive Index Profiler manufactured by Interfiber Analysis, LLC of Sharon, Mass.

The terms "microns" and "µm" are used interchangeably herein.

Single mode optical fibers have been proposed that have good bend performance and are low cost. These optical fibers generally include a central glass core portion surrounded by a low-index trench that, in turn, is surrounded by an outer glass cladding. Optionally, an inner glass cladding may be disposed between the low-index trench and the core portion. These optical fibers utilize chlorine doping in the outer glass cladding to obtain the desired bend performance in the optical fiber.

It has been found that the concentration of chlorine in the outer glass cladding increases the viscosity of the outer glass cladding which, in turn, causes relatively high axial stresses to develop during manufacture in regions of the optical fiber directly adjacent to the core portion of the optical fiber such as the inner glass cladding and/or the low-index trench surrounding the core portion. Specifically, it has been found that chlorine in the outer glass cladding results in an optical fiber having regions directly adjacent to the core portion, such as the inner glass cladding and/or the low-index trench, with lower viscosity than the core portion or the outer cladding. The viscosity differential results in higher draw-induced axial stresses during fiber manufacture. These relatively high axial stresses increase the attenuation of light propagating in the core portion of the optical fiber, reducing the efficiency of the optical fiber.

The embodiments of the optical fibers described herein reduce the axial stresses in regions adjacent to the core portion of the optical fiber and provide for optical fibers with low bend losses and reduced attenuation.

Figure 3:
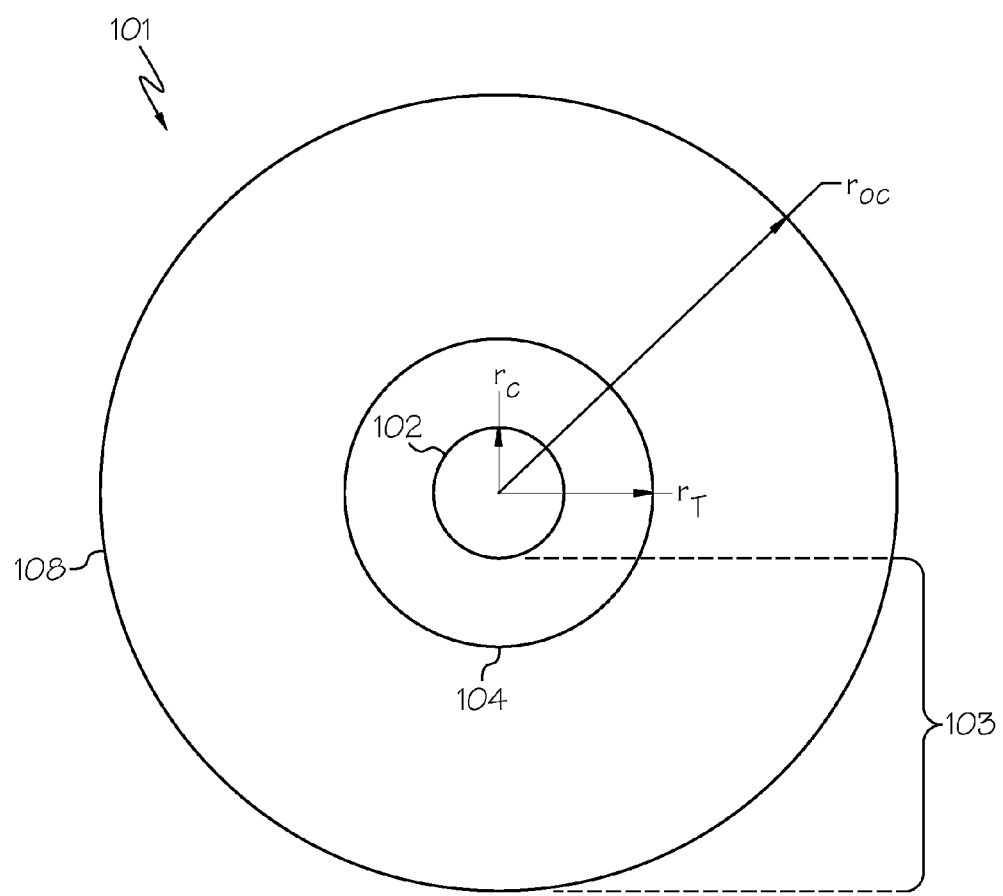
FIG. 3 schematically depicts a radial cross section of an optical fiber according to one or more embodiments shown and described herein.

FIG. 1 schematically depicts a radial cross section of one embodiment of an optical fiber 100. The optical fibers described herein are single mode optical fibers meaning that the fibers support the propagation of single mode of electromagnetic radiation above a specified wavelength (i.e., the cable cutoff wavelength). The optical fibers generally comprise a core portion 102 and a cladding portion 103. The cladding portion comprises at least a low-index trench 106 and an outer cladding 108. In some embodiments, the cladding portion 103 of the optical fibers may further include an inner cladding 104 positioned between the core portion 102 and the low-index trench 106, as depicted in FIG. 1. However, it should be understood that the inner cladding 104 is optional and that, in some embodiments, the optical fiber 100 may be formed without the inner cladding 104 (e.g., as depicted in FIG. 3). The structure and composition of the optical fibers as well as the properties of the optical fibers will be described in more detail herein.

Figure 2:
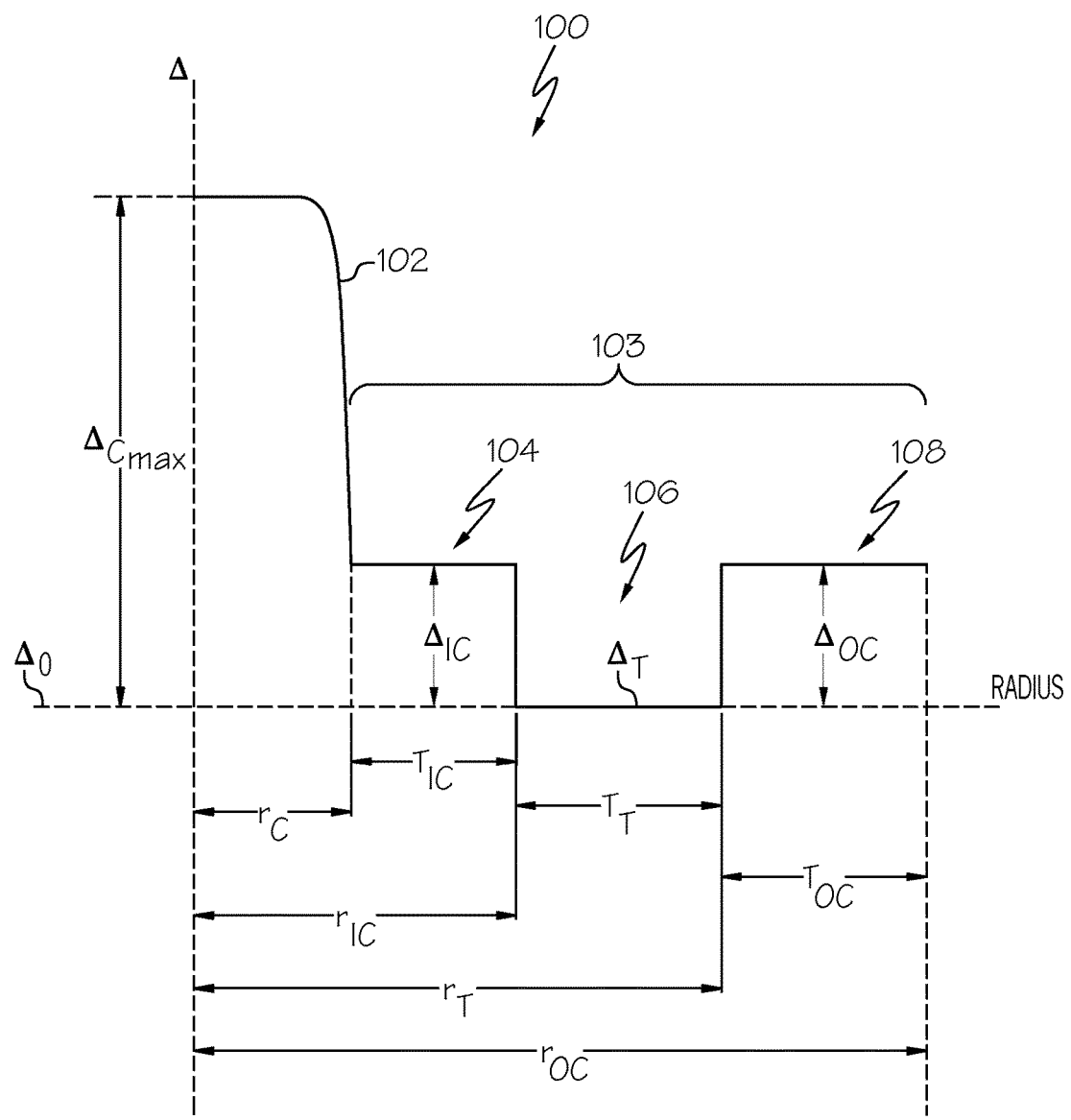
FIG. 2 graphically depicts the relative refractive index profile of the optical fiber of FIG. 1 as a function of the radius R of the glass portion of the optical fiber.

Referring to FIGS. 1 and 2, a radial cross section of one embodiment of an optical fiber 100 (FIG. 1) and the corresponding relative refractive index profile (FIG. 2) of the optical fiber 100 are depicted. The relative refractive index of the optical fiber 100 is plotted as a function of the radius R from the axial centerline of the optical fiber 100. The optical fiber 100 generally comprises a core portion 102 and a cladding portion 103. In the embodiments described herein, the core portion 102 is positioned within the cladding portion 103 and has a maximum relative refractive index $\Delta_{Cmax}$ (relative to pure (i.e., un-doped) silica glass). The core portion 102 and the cladding portion 103 are concentric such that the cross section of the optical fiber 100 is generally circular symmetric with respect to the center of the core portion 102. The cladding portion 103 comprises a low-index trench 106 and an outer cladding 108. The low-index trench 106 surrounds the core portion 102 and has a relative refractive index $\Delta_T$ (relative to pure silica glass). The outer cladding 108 surrounds the low-index trench 106 and has a relative refractive index $\Delta_{OC}$ (relative to pure silica glass). The low-index trench 106 and the outer cladding 108 are arranged such that the low-index trench 106 is disposed between the core portion 102 and the outer cladding 108. In the embodiments described herein, the outer cladding 108 is in direct contact with the low-index trench 106.

The term "trench," as used herein, refers to a region of the optical fiber that is, in radial cross section, surrounded by regions having relatively higher refractive indexes. For example, in the embodiment of the optical fiber 100 depicted in FIGS. 1 and 2, the cladding portion 103 further comprises an inner cladding 104 positioned between the core portion 102 and the low-index trench 106 such that the low-index trench 106 is positioned between the inner cladding 104 and the outer cladding 108. The inner cladding 104 has a relative refractive index $\Delta_{IC}$ (relative to pure silica glass). In this embodiment, the inner cladding 104 is in direct contact with both the core portion 102 and the low-index trench 106. In the embodiment depicted in FIGS. 1 and 2, $\Delta_{Cmax} > \Delta_{OC}$; $\Delta_T < \Delta_{IC}$; and $\Delta_T < \Delta_{OC}$. In the embodiments described herein, $\Delta_{OC}$ may be equal to $\Delta_{IC}$, $\Delta_{OC}$ may be less than $\Delta_{IC}$, or $\Delta_{OC}$ may be greater than $\Delta_{IC}$, so long as $\Delta_{OC}$ and $\Delta_{IC}$ are greater than $\Delta_T$ and $\Delta_{Cmax}$ is greater than $\Delta_{OC}$, $\Delta_{IC}$, and $\Delta_T$.

In the embodiments described herein, the core portion 102, the inner cladding 104 (when present), the low-index trench 106 and the outer cladding 108 are formed from silica, specifically silica glass.

While FIGS. 1 and 2 depict the cladding portion 103 as comprising an inner cladding 104, a low-index trench 106, and an outer cladding 108, it should be understood that, in other embodiments, the cladding portion 103 may be formed without the inner cladding 104, such as when the low-index trench 106 surrounds and is in direct contact with the core portion 102 of the optical fiber 100, as will be described in further detail herein.

Still referring to FIGS. 1 and 2, the core portion 102 has a radius $r_C$. The inner cladding 104, when present, may surround the core portion 102 and extends from the radius $r_C$ to the radius $r_{IC}$ such that the inner cladding 104 has a radial thickness $T_{IC} = r_{IC} - r_C$. The low-index trench 106 surrounds the core portion 102 and the inner cladding 104 and extends from the radius $r_{IC}$ to the radius $r_T$ such that the low-index trench 106 has a radial thickness $T_T = r_T - r_{IC}$. The outer cladding 108 may surround the low-index trench 106 and extends from the radius $r_T$ to the radius $r_{OC}$ such that the outer cladding has a radial thickness of $T_{OC} = r_{OC} - r_T$. Accordingly, the glass portion of the optical fiber 100 (e.g., the core portion 102, the inner cladding 104, the low-index trench 106, and the outer cladding 108) may have a diameter of $2r_{OC}$. In some embodiments described herein, the radius $r_{OC}$ of the glass portion of the optical fiber is 62.5 microns. In some embodiments described herein, the radius $r_{OC}$ of the glass portion of the optical fiber is greater than or equal to 40 microns and less than or equal to 62.5 microns.

The radius $r_C$ of the core portion 102 is defined as the point at which the line tangent to the maximum slope of the relative refractive index profile (i.e., FIG. 2) of the core portion 102 crosses the zero delta line ($\Delta_0$). In the embodiments of the optical fiber depicted in FIGS. 1 and 2, the radius $r_C$ of the core portion 102 is greater than or equal to 2.75 microns and less than or equal to 6 microns or even 7 microns. In some of these embodiments, the radius $r_C$ of the core portion 102 is greater than or equal to 3.5 microns and less than or equal to 5.5 microns, for example greater than or equal to 4 microns and less than or equal to 5 microns or even greater than or equal to 4 microns and less than or equal to 4.5 microns.

In embodiments, the maximum relative refractive index $\Delta_{Cmax}$ of the core portion 102 of the optical fiber 100 is greater than or equal to 0% (i.e., when the core portion 102 is formed from pure silica) and less than or equal to 0.65%. In some of these embodiments, the maximum relative refractive index $\Delta_{Cmax}$ of the core portion 102 is greater than or equal to 0.4% and less than or equal to 0.65% or even greater than or equal to 0.4% and less than or equal to 0.6%. In some embodiments the maximum relative refractive index $\Delta_{Cmax}$ of the core portion 102 is greater than or equal to 0.4% and less than or equal to 0.5%.

To obtain maximum relative refractive index $\Delta_{Cmax}$ values greater than 0.1%, the core portion 102 of the optical fiber 100 may be up-doped with one or more dopants which increase the refractive index of silica glass. Suitable up-dopants include, without limitation, $GeO_2$, $Al_2O_3$, $P_2O_5$, $TiO_2$, Cl, or the like. For example, up-doping the core portion 102 with 1 wt. % $GeO_2$ is the equivalent of increasing the relative refractive index of the core portion 120 by 0.055%. In embodiments, the core portion is up-doped with greater than or equal to 7 wt. % and less than or equal to 12 wt. % $GeO_2$.

In the embodiment of the optical fiber 100 depicted in FIGS. 1 and 2, the core portion 102 of the optical fiber 100 has a core alpha ($\alpha$) that is greater than or equal to 5 or even greater than or equal to 10. In some embodiments, $\alpha$ of the core portion 102 is greater than or equal to 10 and less than or equal to 100. In some of these embodiments, $\alpha$ of the core portion 102 is greater than or equal to 15 and less than or equal to 100 or even greater than or equal to 15 and less than or equal to 40.

Still referring to FIGS. 1 and 2, the inner cladding 104 is directly adjacent to and in direct contact with the core portion 102. The inner radius of the inner cladding 104 is equal to the radius $r_C$ of the core portion and the outer radius of the inner cladding 104 (i.e., the radius $r_{IC}$ of the inner cladding 104) is defined as the radially outer-most point at which the line tangent to the maximum slope of the relative refractive index profile (i.e., FIG. 2) of the inner cladding crosses the zero delta line ($\Delta_0$). In the embodiments depicted in FIG. 1, the radius $r_{IC}$ of the inner cladding 104 is greater than or equal to 6.5 microns and less than or equal to 15 microns, such as greater than or equal to 6.5 microns and less than or equal to 13 microns. In some of these embodiments, the radius $r_{IC}$ of the inner cladding 104 is greater than or equal to 7 microns and less than or equal to 11 microns or even greater than or equal to 8 microns and less than or equal to 10 microns.

In embodiments, the ratio of the radius $r_C$ of the core portion 102 to the radius $r_{IC}$ of the inner cladding 104 ($r_C:r_{IC}$) is less than or equal to 0.7. In some embodiments, ($r_C:r_{IC}$) is less than or equal to 0.5 or even less than or equal to 0.3. In some embodiments ($r_C:r_{IC}$) is greater than or equal to 0.2 and less than or equal to 0.5.

The relative refractive index $\Delta_{IC}$ of the inner cladding 104 is less than or equal to 0.3% relative to pure silica. In embodiments, the relative refractive index $\Delta_{IC}$ of the inner cladding 104 is greater than 0.1% and less than or equal to 0.3%. In some of these embodiments, the relative refractive index $\Delta_{IC}$ of the inner cladding 104 is greater than or equal to 0.1% and less than or equal to 0.25% or even greater than or equal to 0.1% and less than or equal to 0.2%.

In embodiments, the difference between the relative refractive index $\Delta_{Cmax}$ of the core portion 102 and the relative refractive index $\Delta_{IC}$ of the inner cladding 104 (i.e., $\Delta_{Cmax}-\Delta_{IC}$) is greater than or equal to 0.15% and less than or equal to 0.5%. In some of these embodiments, $\Delta_{Cmax}-\Delta_{IC}$ is greater than or equal to 0.2% and less than or equal to 0.45% or even greater than or equal to 0.3% and less than or equal to 0.45%.

In these embodiments, the combination of the values for $r_C$, the difference between $\Delta_{Cmax}$ and $\Delta_{IC}$, and the ratio $r_C:r_{IC}$ result in the optical fiber having a zero dispersion wavelength ($\lambda_0$) greater than or equal to 1300 nm and less than or equal to 1324 nm and a mode field diameter (MFD) greater than or equal to 9.0 microns at a wavelength of 1310 nm.

Still referring to FIGS. 1 and 2, the low-index trench 106 is directly adjacent to and in direct contact with the inner cladding 104. The inner radius of the low-index trench is equal to the radius $r_{IC}$ of the inner cladding and the outer radius of the low-index trench 106 (i.e., radius $r_T$ of the low-index trench 106) is defined as the radially outer-most point at which the line tangent to the maximum slope of the relative refractive index profile (i.e., FIG. 2) of the low-index trench crosses the zero delta line ($\Delta_0$).

In the embodiments depicted in FIG. 1, the radius $r_T$ of the low-index trench 106 is greater than or equal to 10 microns which improves the bend performance of the optical fiber 100 and also results in the optical fiber 100 having a cable cutoff of less than 1260 nm. In embodiments, the radius $r_T$ is greater than or equal to 12 microns and less than or equal to 25 microns, such as greater than or equal to 14.5 microns and less than or equal to 25.5 microns. In some of these embodiments, the radius $r_T$ of the inner cladding 104 is greater than or equal to 15 microns and less than or equal to 22 microns or even greater than or equal to 18 microns and less than or equal to 22 microns.

In embodiments, the radial thickness $T_T$ of the low-index trench 106 is greater than or equal to 4 microns and less than or equal to 22 microns. In some embodiments, the radial thickness $T_T$ of the low-index trench 106 is greater than or equal to 8 microns and less than or equal to 20 microns. In some embodiments, the radial thickness $T_T$ of the low-index trench 106 is greater than or equal to 10 microns and less than or equal to 12 microns.

As noted herein, the relative refractive index $\Delta_T$ of the low-index trench 106 is less than the maximum relative refractive index $\Delta_{Cmax}$ of the core portion 102 and the relative refractive index $\Delta_{IC}$ of the inner cladding 104. In the embodiments described herein, the relative refractive index $\Delta_T$ of the low-index trench 106 is generally less than or equal to 0.1% relative to pure silica. In some embodiments, the relative refractive index $\Delta_T$ of the low-index trench 106 is greater than or equal to −0.4% and less than or equal to 0.1%. For example, in some embodiments, the low-index trench 106 is formed from pure silica glass and the relative refractive index $\Delta_T$ of the low-index trench 106 is 0 as depicted in FIG. 2. In some embodiments, the relative refractive index $\Delta_T$ of the low-index trench 106 is essentially flat. That is, the difference between the relative refractive index $\Delta_T$ at any two radii within the low-index trench 106 is less than 0.03%, or even less than 0.01%. In other embodiments the low-index trench 106 may have small fluctuations in the relative refractive index $\Delta_T$ as a result of small profile design or process variations.

In embodiments where the relative refractive index $\Delta_T$ of the low-index trench 106 is un-doped, the low-index trench 106 is substantially free from fluorine (F) and germania (GeO$_2$), i.e., the silica glass from which the low-index trench 106 is formed contains less than 0.1 wt. % of dopants such as F or GeO$_2$. In embodiments where the relative refractive index of the low-index trench 106 is non-zero, the low-index trench 106 is formed from silica glass which is doped with either F (in the case where relative refractive index $\Delta T$ of the low-index trench 106 is less than 0) or GeO$_2$ (in the case where relative refractive index $\Delta T$ of the low-index trench 106 is greater than 0). In some embodiments, the low-index trench 106 is formed from silica glass which is down-doped with greater than or equal to 0.1 wt. % and less than or equal to 2 wt. % F. In some other embodiments, the low-index trench 106 is formed from silica glass which is up-doped with greater than or equal 0.1 wt. % and less than or equal to 2 wt. % GeO$_2$. Accordingly, it should be understood that, in some embodiments, the low-index trench 106 is formed from substantially pure silica glass while, in some other embodiments, the low-index trench 106 formed from silica glass doped with one or more dopants such that the relative refractive index $\Delta_T$ of the low-index trench 106 is greater than or equal to −0.7% and less than or equal to 0.1%.

In embodiments, the difference between the relative refractive index $\Delta_{IC}$ of the inner cladding 104 and the relative refractive index $\Delta_T$ of the low-index trench 106 (i.e., $\Delta_{IC}-\Delta_T$) is greater than or equal to 0.1% and less than or equal to 0.7%. In some of these embodiments, $\Delta_{IC}-\Delta_T$ is greater than or equal to 0.2% and less than or equal to 0.6% or even greater than or equal to 0.25% and less than or equal to 0.5%. When the difference (i.e., $\Delta_{IC}-\Delta_T$) is within these ranges, the optical properties of the optical fibers meet the ITU-G.652, ITU-G.657, and ITU-G.654 standards.

The radial thickness of a particular glass portion of an optical fiber may be interrelated with a relative refractive index of the particular glass portion. Specifically, a glass portion 'i' with a relative refractive index $\Delta_i$%, an inner radius $R_{in}$ and an outer radius $R_{out}$ may have a trench volume $V_i$ defined as:

$$V_i = 2\int_{R_{in}}^{R_{out}} \Delta_i \% \ (R)dR$$

which may be rewritten as:

$$V_i = \Delta_i\%(R_{out}^2 - R_{in}^2).$$

Accordingly, the low-index trench 106 may have a trench volume $V_T$ of:

$$V_T = \Delta_T\%(r_T^2 - r_{IC}^2)$$

In order to achieve good bend performance, the volume $|V_T|$ of the low-index trench 106 is preferably greater than 30% $\Delta$micron$^2$. In embodiments, the volume $|V_T|$ of the low-index trench 106 may be greater than or equal to 45% $\Delta$micron$^2$ or even greater than or equal to 50% $\Delta$micron$^2$. In some of these embodiments, the volume $|V_T|$ of the low-index trench 106 may be greater than or equal to 55% $\Delta$micron$^2$ or even greater than or equal to 60% $\Delta$micron$^2$. In some embodiments the volume $|V_T|$ of the low-index trench is greater than or equal to 30% $\Delta$micron$^2$ and less than or equal to 90% $\Delta$micron$^2$. In some of these embodiments, the volume $|V_T|$ of the low-index trench is greater than or equal to 40% $\Delta$micron$^2$ and less than or equal to 80% $\Delta$micron$^2$.

Still referring to FIGS. 1 and 2, the outer cladding 108 is directly adjacent to and in direct contact with the low-index trench 106. The inner radius of the outer cladding 108 is equal to the radius $r_T$ of the low-index trench 106 and the outer radius of the outer cladding 108 (i.e., radius $r_{OC}$ of the outer cladding 108) is defined as the radially outer-most point at which the line tangent to the maximum slope of the relative refractive index profile (i.e., FIG. 2) of the outer cladding crosses the zero delta line ($\Delta_0$). In the embodiments depicted in FIG. 1, the radius $r_{OC}$ of the outer cladding 108 is 65 microns. In some embodiments described herein, the radius $r_{OC}$ of the glass portion of the optical fiber is greater than or equal to 40 microns and less than or equal to 62.5 microns.

As noted herein, the outer cladding 108 has a relative refractive index $\Delta_{OC}$ which is greater than the relative refractive index $\Delta_T$ of the low-index trench 106, thereby forming a region which is "up-doped" relative to the low-index trench 106. To achieve this index differential, the outer cladding 108 is formed from silica glass which includes an amount of up-dopant sufficient to increase the refractive index of the silica glass of the outer cladding 108. In the embodiments described herein, the up-dopant in the outer cladding 108 is bromine (Br). It has been found that intentionally up-doping the outer cladding 108 with bromine reduces the axial stresses in the regions of the optical fiber directly adjacent to the core portion which, in turn, reduces the attenuation of optical fiber 100. Specifically, it has been found that bromine results in a greater index change in silica per unit weight % of the up-dopant, thereby producing similar optical properties in the optical fiber with less dopant. That is, less wt. % bromine is required versus the wt. % of chlorine to create a similar index in the halogen-doped region of the optical fiber (i.e., the outer cladding). The lower concentrations of up-dopant (specifically halogen up-dopant) in the outer cladding 108 yields a higher viscosity outer cladding 108 resulting in the outer cladding 108 bearing more stress during fiber manufacture and, as a result, reducing the axial stresses in the inner cladding 104 and/or low-index trench 106. The reduction in axial stresses in the region directly adjacent to the core portion 102 reduces the attenuation of light in the optical fiber 100.

In embodiments, the outer cladding 108 is up-doped with bromine by first forming layers of silica-based glass soot as a preform of the outer cladding and, thereafter, consolidating the layers of silica-based glass soot in an atmosphere comprising $SiBr_4$ and helium, thereby doping the soot of the outer cladding with Br. It has been found that the amount of Br in the consolidated glass is proportional to $[SiBr_4]^{0.5}$, where $[SiBr_4]$ is the partial pressure of $SiBr_4$ during the consolidation process. It has also been found that doping the glass soot with $SiBr_4$ results in a relative refractive index change of approximately 0.123% per 1 wt. % of Br in the glass.

In the embodiments described herein, the bromine concentration in the outer cladding 108 is greater than or equal to 0.25 wt. %. In some embodiments, the bromine concentration in the outer cladding 108 is greater than or equal to 0.3 wt. % or even greater than or equal to 0.4 wt. %. In some of these embodiments, the concentration of bromine in the outer cladding 108 is greater than or equal to 0.5 wt. % or even greater than or equal to 0.6 wt. %. In still other embodiments, the bromine concentration in the outer cladding 108 is greater than or equal to 0.7 wt. % or even greater than or equal to 0.8 wt. %. In some embodiments, the bromine concentration in the outer cladding 108 is greater than or equal to 0.9 wt. % or even greater than or equal to 1.0 wt. %.

In some embodiments, the bromine concentration in the outer cladding 108 is greater than or equal to 0.25 wt. % and less than or equal to 3.0 wt. %. In some of these embodiments, the bromine concentration in the outer cladding 108 is greater than or equal to 0.25 wt. % and less than or equal to 2.5 wt. % or even less than or equal to 2.0 wt. %. In still other embodiments, the bromine concentration in the outer cladding 108 is greater than or equal to 0.25 wt. % and less than or equal to 1.5 wt. % or even less than or equal to 1.0 wt. %.

In some embodiments, the bromine concentration in the outer cladding 108 is greater than or equal to 1.0 wt. %, or even greater than or equal to 1.2 wt. %, and less than or equal to 3.0 wt. %. In some of these embodiments, the bromine concentration in the outer cladding 108 is greater than or equal to 1.0 wt. %, or even greater than or equal to 1.2 wt. %, and less than or equal to 2.75 wt. %, or even less than or equal to 2.5 wt. %. In still other embodiments, the bromine concentration in the outer cladding 108 is greater than or equal to 1.0 wt. %, or even greater than or equal to 1.2 wt. %, and less than or equal to 2.25 wt. %, or even less than or equal to 2.0 wt. %. In still other embodiments, the bromine concentration in the outer cladding 108 is greater than or equal to 1.0 wt. %, or even greater than or equal to 1.2 wt. %, and less than or equal to 1.75 wt. %, or even less than or equal to 1.5 wt. %. In still other embodiments, the bromine concentration in the outer cladding 108 is greater than or equal to 1.0 wt. %, or even greater than or equal to 1.2 wt. %, and less than or equal to 1.25 wt. %.

In the embodiments described herein, the concentration of bromine in the outer cladding 108 is sufficient to increase the relative refractive index of the silica glass of the outer cladding such that the relative refractive index $\Delta_{OC}$ of the outer cladding 108 is greater than or equal to 0.1% and less than or equal to 0.4%. For example, in some embodiments, the relative refractive index $\Delta_{OC}$ of the outer cladding 108 is greater than or equal to 0.12% or even greater than or equal to 0.13% and less than or equal to 0.4%. In some of these embodiments, the relative refractive index $\Delta_{OC}$ of the outer cladding 108 is greater than or equal to 0.14% and less than or equal to 0.4%. In some other embodiments, the relative refractive index $\Delta_{OC}$ of the outer cladding 108 is greater than or equal to 0.12% and less than or equal to 0.3%. For example, in some embodiments, the relative refractive index $\Delta_{OC}$ of the outer cladding 108 is greater than or equal to 0.13% or even greater than or equal to 0.14% and less than or equal to 0.3%. In some of these embodiments, the relative refractive index $\Delta_{OC}$ of the outer cladding 108 is greater than or equal to 0.15% and less than or equal to 0.3%.

In some embodiments the difference between the relative refractive index $\Delta_{OC}$ of the outer cladding 108 and the relative refractive index $\Delta_T$ of the low-index trench 106 is greater than or equal to 0.1% and less than or equal to 0.4%. In some embodiments, the difference between the relative refractive index $\Delta_{OC}$ of the outer cladding 108 and the relative refractive index $\Delta_T$ or the low-index trench 106 is greater than or equal to 0.12% and less than or equal to 0.3%. When the difference (i.e., $\Delta_{OC}-\Delta_T$) is within these ranges, the optical properties of the optical fibers meet the ITU-G.652, ITU-G.657, and ITU-G.654 standards.

Figure 4:
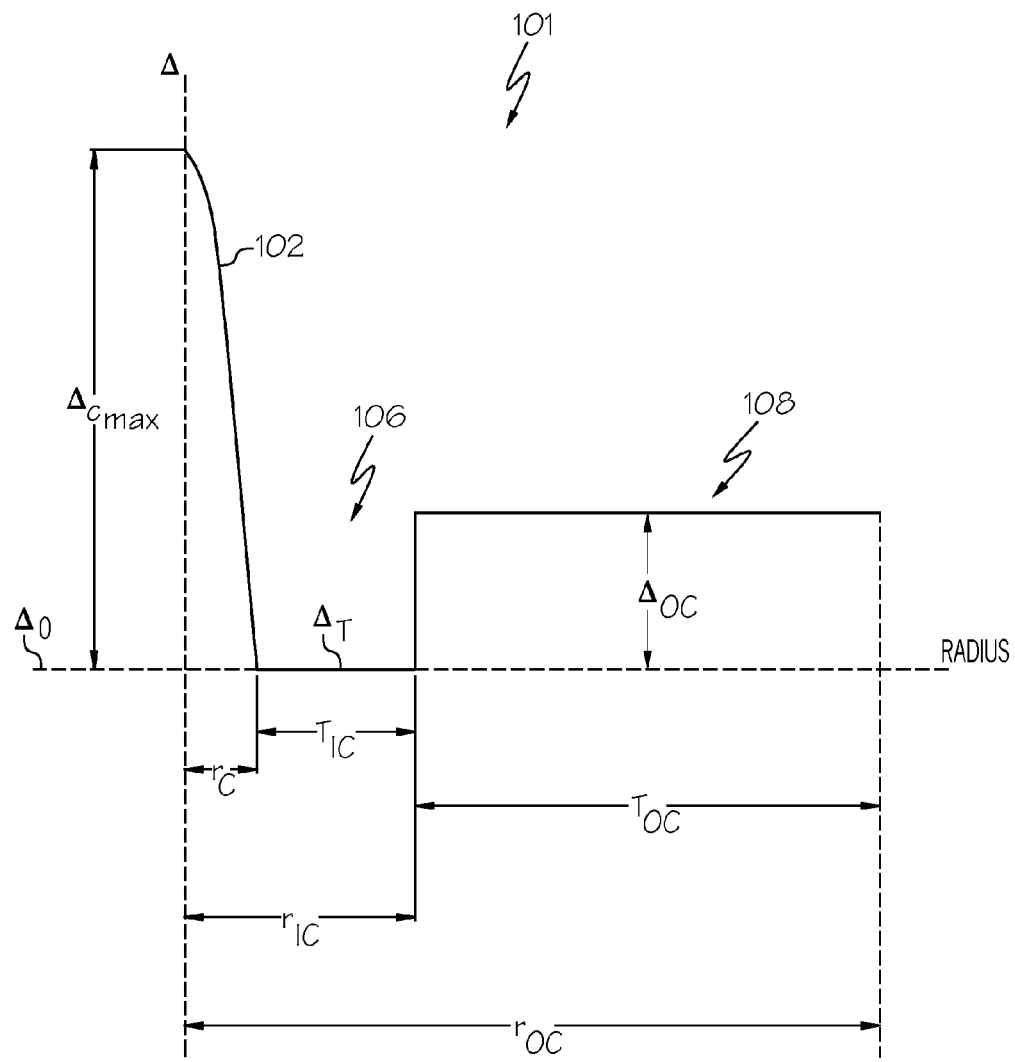
FIG. 4 graphically depicts the relative refractive index profile of the optical fiber of FIG. 3 as a function of the radius R of the glass portion of the optical fiber.

While FIGS. 1 and 2 depict an optical fiber 100 which includes an inner cladding 104 positioned around the core portion 102 between the core portion 102 and low-index trench 106, it should be understood that the inner cladding 104 is optional and that, in some embodiments, the optical fibers described herein are formed without an inner cladding. For example, FIG. 3 schematically depicts an axial cross section of an optical fiber 101 that does not include an inner cladding portion. FIG. 4 graphically depicts the relative refractive index profile of the optical fiber 101 of FIG. 3 as function of the radius R of the optical fiber from the axial centerline.

Referring to FIGS. 3 and 4, the optical fiber 101 generally comprises a core portion 102 and a cladding portion 103. In the embodiments described herein, the core portion 102 is positioned within the cladding portion 103 and has a maximum relative refractive index $\Delta_{Cmax}$ (relative to pure (i.e., un-doped) silica glass). The core portion 102 and the cladding portion 103 are concentric such that the cross section of the optical fiber 101 is generally circular symmetric with respect to the center of the core portion 102. The cladding portion 103 comprises a low-index trench 106 and an outer cladding 108. The low-index trench 106 surrounds and is in direct contact with the core portion 102 and has a relative refractive index $\Delta_T$ (relative to pure silica glass). The outer cladding 108 surrounds and is in direct contact with the low-index trench 106 and has a relative refractive index $\Delta_{OC}$ (relative to pure silica glass). That is, the low-index trench 106 and the outer cladding 108 are arranged such that the low-index trench 106 is disposed between the core portion 102 and the outer cladding 108. In the embodiment of the optical fiber 101 depicted in FIGS. 3 and 4, $\Delta_{Cmax} > \Delta_{OC}$; and $\Delta_T < \Delta_{OC}$.

Still referring to FIGS. 3 and 4, the core portion 102 has a radius $r_C$. The low-index trench 106 surrounds the core portion 102 and extends from the radius $r_C$ to the radius $r_T$ such that the low-index trench has a radial thickness $T_T = r_T - r_C$. The outer cladding portion 108 may surround the low-index trench 106 and extend from the radius $r_T$ to the radius $r_{OC}$ such that the outer cladding has a radial thickness of $T_{OC} = r_{OC} - r_T$. Accordingly, the glass portion of the optical fiber 100 (e.g., the core portion 102, the low-index trench 106, and the outer cladding portion 108) may have a diameter of $2r_{OC}$. In some embodiments described herein, the radius $r_{OC}$ of the glass portion of the optical fiber is 62.5 microns. In some embodiments described herein, the radius $r_{OC}$ of the glass portion of the optical fiber is greater than or equal to 40 microns and less than or equal to 62.5 microns.

The radius $r_C$ of the core portion 102 is defined as the point at which the line tangent to the maximum slope of the relative refractive index profile (i.e., FIG. 4) of the core portion 102 crosses the zero delta line ($\Delta_0$). In the embodiments of the optical fiber depicted in FIGS. 3 and 4, the radius $r_C$ of the core portion 102 is greater than or equal to 4 microns and less than or equal to 10 microns. In some of these embodiments, the radius $r_C$ of the core portion 102 is greater than or equal to 4.5 microns and less than or equal to 7.5 microns, for example greater than or equal to 5 microns and less than or equal to 7 microns or even greater than or equal to 5.5 microns and less than or equal to 7 microns.

In embodiments, the maximum relative refractive index $\Delta_{Cmax}$ of the core portion 102 of the optical fiber 101 is greater than or equal to 0% (i.e., when the core portion 102 is formed from pure silica) and less than or equal to 0.65%. In some of these embodiments, the maximum relative refractive index $\Delta_{Cmax}$ of the core portion 102 is greater than or equal to 0.4% and less than or equal to 0.65% or even greater than or equal to 0.4% and less than or equal to 0.6%. In some embodiments the maximum relative refractive index $\Delta_{Cmax}$ of the core portion 102 is greater than or equal to 0.4% and less than or equal to 0.5%.

To obtain maximum relative refractive index $\Delta_{Cmax}$ values greater than 0.1% in the core portion 102, the core portion 102 of the optical fiber 101 may be up-doped with one or more dopants which increase the refractive index of silica glass. Suitable up-dopants include, without limitation, $GeO_2$, $Al_2O_3$, $P_2O_5$, $TiO_2$, Cl, or the like. For example, up-doping the core portion 102 with 1 wt. % $GeO_2$ is the equivalent of increasing the relative refractive index of the core portion 120 by 0.055%. In embodiments, the core portion is up-doped with greater than or equal to 2 wt. % and less than or equal to 12 wt. % $GeO_2$.

In these embodiments of the optical fiber 101 (i.e., embodiments in which the low-index trench 106 directly adjacent to and in contact with the core portion 102), the dispersion properties of the optical fiber 101 are undesirable when the core portion 102 is formed with a step index or with an alpha profile having a relatively high core alpha. Accordingly, in the embodiment of the optical fiber 101 depicted in FIGS. 3 and 4, the core portion 102 of the optical fiber 101 has an alpha profile with a core alpha (a) that is greater than or equal to 0.1 and less than or equal to 5. In some of these embodiments, a of the core portion 102 is greater than or equal to 0 and less than or equal to 4.5, less than or equal to 4, or even less than or equal to 3.5. In some embodiments, the core portion 102 of the optical fiber 101 has an alpha profile with an a greater than or equal to 1 and less than or equal to 5, greater than or equal to 1 and less than or equal to 3, or even an alpha profile with an a greater than or equal to 1.5 and less than or equal to 3.

Still referring to FIGS. 3 and 4, the low-index trench 106 is directly adjacent to and in direct contact with the core portion 102. The inner radius of the low-index trench is equal to the radius $r_C$ of the core portion 102 and the outer radius of the low-index trench 106 (i.e., the radius $r_T$ of the low-index trench 106) is defined as the radially outer-most point at which the line tangent to the maximum slope of the relative refractive index profile (i.e., FIG. 4) of the low-index trench crosses the zero delta line ($\Delta_0$).

In the embodiments depicted in FIG. 3, the radius $r_T$ of the low-index trench 106 is greater than or equal to 10 microns which improves the bend performance of the optical fiber 101 and also results in the optical fiber 101 having a cable cutoff of less than 1260 nm. In embodiments, the radius $r_T$ is greater than or equal to 14 microns and less than or equal to 25 microns, such as greater than or equal to 14.5 microns and less than or equal to 25.5 microns. In some of these embodiments, the radius $r_T$ of the inner cladding 104 is greater than or equal to 15 microns and less than or equal to 22 microns or even greater than or equal to 18 microns and less than or equal to 22 microns.

In embodiments, the radial thickness $T_T$ of the low-index trench 106 is greater than or equal to 4 microns and less than or equal to 22 microns. In some embodiments, the radial thickness $T_T$ of the low-index trench 106 is greater than or equal to 8 microns and less than or equal to 20 microns. In some embodiments, the radial thickness $T_T$ of the low-index trench 106 is greater than or equal to 10 microns and less than or equal to 12 microns.

As noted herein, the relative refractive index $\Delta_T$ of the low-index trench 106 is less than the maximum relative refractive index $\Delta_{Cmax}$ of the core portion 102 and the relative refractive index $\Delta_{IC}$ of the inner cladding 104. In the embodiments described herein, the relative refractive index $\Delta_T$ of the low-index trench 106 is generally less than or equal to 0.1% relative to pure silica glass. In some embodiments, the relative refractive index $\Delta_T$ of the low-index trench 106 is greater than or equal to −0.4% and less than or equal to 0.1%. For example, in some embodiments, the low-index trench 106 is formed from pure silica glass and the relative refractive index $\Delta_T$ of the low-index trench 106 is 0 as depicted in FIG. 4. In some embodiments, the relative refractive index $\Delta_T$ of the low-index trench 106 is essentially flat. That is, the difference between the relative refractive index $\Delta_T$ at any two radii within the low-index trench 106 is less than 0.03%, or even less than 0.01%. In other embodiments the low-index trench 106 may have small fluctuations in the relative refractive index $\Delta_T$ as a result of small profile design or process variations.

In order to achieve the desired relative refractive index $\Delta_T$ of the low-index trench 106, the low-index trench 106 may be formed from pure silica glass, or silica glass containing one or more dopants (i.e., up-dopants or down-dopants) as described herein above with respect to the optical fiber 100 depicted in FIGS. 1 and 2.

As noted herein, in order to achieve good bend performance, the volume $|V_T|$ of the low-index trench 106 is preferably greater than 30% $\Delta$micron$^2$. In embodiments, the volume $|V_T|$ of the low-index trench 106 may be greater than or equal to 45% $\Delta$micron$^2$ or even greater than or equal to 50% $\Delta$micron$^2$. In some of these embodiments, the volume $|V_T|$ of the low-index trench 106 may be greater than or equal to 55% $\Delta$micron$^2$ or even greater than or equal to 60% $\Delta$micron$^2$. In some embodiments the volume $|V_T|$ of the low-index trench is greater than or equal to 30% $\Delta$micron$^2$ and less than or equal to 90% $\Delta$micron$^2$. In some of these embodiments, the volume $|V_T|$ of the low-index trench is greater than or equal to 40% $\Delta$micron$^2$ and less than or equal to 80% $\Delta$micron$^2$.

Still referring to FIGS. 3 and 4, the outer cladding 108 is directly adjacent to and in direct contact with the low-index trench 106, as described above with respect to the embodiment of the optical fiber 100 depicted in FIGS. 1 and 2. That is, the inner radius of the outer cladding 108 is equal to the radius $r_T$ of the low-index trench 106 and the outer radius of the outer cladding 108 (i.e., radius $r_{OC}$ of the outer cladding 108) is defined as the radially outer-most point at which the line tangent to the maximum slope of the relative refractive index profile (i.e., FIG. 4) of the outer cladding crosses the zero delta line ($\Delta_0$). In the embodiments depicted in FIG. 3, the radius $r_{OC}$ of the outer cladding 108 is less than 65 microns. In some embodiments described herein, the radius $r_{OC}$ of the glass portion of the optical fiber is 62.5 microns. In some embodiments described herein, the radius $r_{OC}$ of the glass portion of the optical fiber is greater than or equal to 40 microns and less than or equal to 62.5 microns.

As with the embodiment of the optical fiber 100 depicted in FIGS. 1 and 2, the outer cladding 108 of the optical fiber 101 depicted in FIGS. 3 and 4 has a relative refractive index $\Delta_{OC}$ which is greater than the relative refractive index $\Delta_T$ of the low-index trench 106, thereby forming a region which is "up-doped" relative to the low-index trench 106. In this embodiment, the outer cladding is up-doped with bromine as described herein with respect to the embodiment of the optical fiber 100 depicted in FIGS. 1 and 2.

In the embodiments described herein, the bromine concentration in the outer cladding 108 is greater than or equal to 0.25 wt. %. In some embodiments, the bromine concentration in the outer cladding 108 is greater than or equal to 0.3 wt. % or even greater than or equal to 0.4 wt. %. In some of these embodiments, the concentration of bromine in the outer cladding 108 is greater than or equal to 0.5 wt. % or even greater than or equal to 0.6 wt. %. In still other embodiments, the bromine concentration in the outer cladding 108 is greater than or equal to 0.7 wt. % or even greater than or equal to 0.8 wt. %. In some embodiments, the bromine concentration in the outer cladding 108 is greater than or equal to 0.9 wt. % or even greater than or equal to 1.0 wt. %.

In some embodiments, the bromine concentration in the outer cladding 108 is greater than or equal to 0.25 wt. % and less than or equal to 3.0 wt. %. In some of these embodiments, the bromine concentration in the outer cladding 108 is greater than or equal to 0.25 wt. % and less than or equal to 2.5 wt. % or even less than or equal to 2.0 wt. %. In still other embodiments, the bromine concentration in the outer cladding 108 is greater than or equal to 0.25 wt. % and less than or equal to 1.5 wt. % or even less than or equal to 1.0 wt. %.

In some embodiments, the bromine concentration in the outer cladding 108 is greater than or equal to 1.0 wt. %, or even greater than or equal to 1.2 wt. %, and less than or equal to 3.0 wt. %. In some of these embodiments, the bromine concentration in the outer cladding 108 is greater than or equal to 1.0 wt. %, or even greater than or equal to 1.2 wt. %, and less than or equal to 2.75 wt. %, or even less than or equal to 2.5 wt. %. In still other embodiments, the bromine concentration in the outer cladding 108 is greater than or equal to 1.0 wt. %, or even greater than or equal to 1.2 wt. %, and less than or equal to 2.25 wt. %, or even less than or equal to 2.0 wt. %. In still other embodiments, the bromine concentration in the outer cladding 108 is greater than or equal to 1.0 wt. %, or even greater than or equal to 1.2 wt. %, and less than or equal to 1.75 wt. %, or even less than or equal to 1.5 wt. %. In still other embodiments, the bromine concentration in the outer cladding 108 is greater than or equal to 1.0 wt. %, or even greater than or equal to 1.2 wt. %, and less than or equal to 1.25 wt. %.

In the embodiments described herein, the concentration of bromine in the outer cladding 108 is sufficient to increase the relative refractive index of the silica glass of the outer cladding such that the relative refractive index $\Delta_{OC}$ of the outer cladding 108 is greater than or equal to 0.1% and less than or equal to 0.4%. For example, in some embodiments, the relative refractive index $\Delta_{OC}$ of the outer cladding 108 is greater than or equal to 0.12% or even greater than or equal to 0.13% and less than or equal to 0.4%. In some of these embodiments, the relative refractive index $\Delta_{OC}$ of the outer cladding 108 is greater than or equal to 0.14% and less than or equal to 0.4%. In some other embodiments, the relative refractive index $\Delta_{OC}$ of the outer cladding 108 is greater than or equal to 0.12% and less than or equal to 0.3%. For example, in some embodiments, the relative refractive index $\Delta_{OC}$ of the outer cladding 108 is greater than or equal to 0.13% or even greater than or equal to 0.14% and less than or equal to 0.3%. In some of these embodiments, the relative refractive index $\Delta_{OC}$ of the outer cladding 108 is greater than or equal to 0.15% and less than or equal to 0.3%.

In some embodiments the difference between the relative refractive index $\Delta_{OC}$ of the outer cladding 108 and the relative refractive index $\Delta_T$ or the low-index trench 106 is greater than or equal to 0.1% and less than or equal to 0.4%. In some embodiments, the difference between the relative refractive index $\Delta_{OC}$ of the outer cladding 108 and the relative refractive index $\Delta_T$ or the low-index trench 106 is greater than or equal to 0.12% and less than or equal to 0.3%. When the difference (i.e., $\Delta_{OC}-\Delta_T$) is within these ranges, the optical properties of the optical fibers meet the ITU-G.652, ITU-G.657, and ITU-G.654 standards.

Referring to FIGS. 1-4, in some embodiments, the core portion of the optical fiber may comprise a relative refractive index profile having a so-called centerline dip which may occur as a result of one or more optical fiber manufacturing techniques. However, the centerline dip in any of the refractive index profiles disclosed herein is optional.

The optical fibers disclosed herein may be surrounded by a protective coating, e.g. a primary coating (not shown) contacting and surrounding the outer cladding 108. The primary coating may have a Young's modulus of less than 1.0 MPa, in some embodiments, less than 0.9 MPa, and in some embodiments not more than 0.8 MPa. In embodiments, the optical fiber may further comprise a secondary coating (not shown) contacting and surrounding the primary coating. The secondary coating may have a Young's modulus of greater than 1200 MPa, and in some embodiments greater than 1400 MPa.

According to some embodiments of the optical fibers which have primary and secondary coatings, the outer diameter of the secondary coating is less than 250 microns. In other embodiments, the outer diameter of the secondary coating is less than 210 microns.

As used herein, the Young's modulus of a cured polymeric material of a primary coating is measured using a tensile testing instrument (e.g., a Sintech MTS Tensile Tester, or an INSTRON Universal Material Test System) on a sample of a material shaped as a film between about 0.003" (76 micron) and 0.004" (102 micron) in thickness and about 1.3 cm in width, with a gauge length of 5.1 cm, and a test speed of 2.5 cm/min.

Additional description of suitable primary and secondary coatings can be found in PCT Publication WO2005/010589 which is incorporated herein by reference in its entirety.

Preferably, the optical fibers disclosed herein have a low OH content, and preferably have an attenuation curve which exhibits a relatively low, or no, water peak in a particular wavelength region, especially in the E-band. The optical fibers disclosed herein preferably have an optical attenuation (spectral) at 1383 nm which is not more than 0.10 dB/km above an optical attenuation at 1310 nm, and more preferably not more than the optical attenuation at 1310 nm. The optical fibers disclosed herein preferably have a maximum hydrogen induced attenuation change of less than 0.03 dB/km at 1383 nm after being subjected to a hydrogen atmosphere, for example 0.01 atm partial pressure hydrogen for at least 144 hours.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm.

The fibers disclosed herein exhibit low polarization mode dispersion (PMD) values particularly when fabricated with outside vapor deposition (OVD) processes. Spinning of the optical fiber may also lower PMD values for the fibers disclosed herein.

Referring to FIGS. 1-4, in the embodiments of the optical fibers 100, 101 described herein, the outer cladding 108 of the optical fibers 100, 101 is up-doped with bromine which, in turn, lowers the stress in regions of the optical fiber directly adjacent to the core portion 102, thereby improving the attenuation of the optical fibers 100, 101. For example, in the embodiment of the optical fiber 100 depicted in FIGS. 1 and 2, up-doping the outer cladding 108 with bromine decreases the axial stress in the region of the optical fiber 100 directly adjacent to the core portion 102 (i.e., the inner cladding 104) which, in turn, decreases the attenuation of the optical fiber 100. Similarly, in the embodiment of the optical fiber 101 depicted in FIGS. 3 and 4, up-doping the outer cladding 108 with bromine decreases the axial stress in the region of the optical fiber 100 directly adjacent to the core portion 102 (i.e., the low-index trench 104) which, in turn, decreases the attenuation of the optical fiber 100.

In the embodiments described herein, the axial stress in the region of the optical fiber 100, 101 directly adjacent to the core portion 102 (i.e., the axial stress in the inner cladding 104 or the axial stress in the low-index trench 106) is less than or equal to 2.5 MPa. In embodiments, the axial stress in the region of the optical fiber 100, 101 directly adjacent to the core portion 102 is less than or equal to 2.0 MPa or even less than or equal to 1.5 MPa. In embodiments, the axial stress in the region of the optical fiber 100, 101 directly adjacent to the core portion 102 is less than or equal to 1.25 MPa or even less than or equal to 1.0 MPa. In embodiments, the axial stress in the region of the optical fiber 100, 101 directly adjacent to the core portion 102 is less than or equal to 0.75 MPa or even less than or equal to 0.5 MPa.

The embodiments of the optical fibers described herein (i.e., the embodiments of the optical fiber schematically depicted in FIGS. 1-4) are G.652 compliant. That is, the optical fibers have mode field diameters (MFD) greater than 9 microns and less than 9.5 microns at a wavelength of 1310 nm, cable cutoff wavelengths of less than 1260 nm and greater than 1000 nm, attenuation at 1550 nm of less than or equal to 0.185 dB/km, and a zero dispersion wavelength $\lambda_0$ greater than or equal to 1300 nm and less than or equal to 1324 nm.

In the embodiments described herein, the optical fibers have mode field diameters at a wavelength of 1550 nm ($MFD_{1550}$) greater than or equal to 9.5 microns and less than or equal to 12 microns. In some embodiments, $MFD_{1550}$ is greater than or equal to 10 microns and less than or equal to 11 microns or even greater than or equal to 10 microns and less than or equal to 10.6 microns.

In the embodiments described herein, the optical fibers have mode field diameters at a wavelength of 1310 nm ($MFD_{1310}$) greater than or equal to 8.2 microns and less than or equal to 10 microns. In some embodiments, $MFD_{1310}$ is greater than or equal to 8.6 microns and less than or equal to 9.5 microns. In some embodiments, the MFD1310 is greater than or equal to 9 microns, such as greater than or equal to 9 microns and less than or equal to 9.4 microns.

Additionally, the embodiments of the optical fibers described herein exhibit a macrobend bend loss that is less than 0.5 dB/turn at 1550 nm when the optical fiber is wound around a 15 mm diameter mandrel. In other embodiments, the 15 mm diameter bend loss at 1550 nm is less than or equal to 0.3 dB/turn, less than or equal to 0.2 dB/turn, or even less than or equal to 0.1 dB/turn (e.g., 0.075 dB/turn to 0.29 dB/turn, or 0.09 dB/turn to 0.25 dB/turn).

In some embodiments, the 20 mm diameter bend loss (i.e., when the optical fiber is wound around a 20 mm diameter mandrel) at 1550 nm is less than 0.2 dB/turn, for example less than or equal to 0.1 dB/turn, and in some embodiments less than or equal to 0.05 dB/turn, or even less than or equal to 0.03 dB/turn at 1550 nm.

In some embodiments, the 30 mm diameter bend loss (i.e., when the optical fiber is wound around a 30 mm diameter mandrel) at 1550 nm is less than 0.02 dB/turn, for example less than or equal to 0.01 dB/turn, and in some embodiments less than or equal to 0.005 dB/turn, or even less than or equal to 0.003 dB/turn at 1550 nm.

In some embodiments, the 10 mm diameter bend loss (i.e., when the optical fiber is wound around a 10 mm diameter mandrel) at 1550 nm is less than 1 dB/turn, in some embodiments, ≤0.75 dB/turn, in some embodiments ≤0.5 dB/turn, and in some embodiments ≥0.05 and ≤0.75 dB/turn, 1550 nm.

The optical fibers described herein have an attenuation at 1550 nm which is less than or equal to 0.185 dB/km, for example, less than 0.182 dB/km. In embodiments, the optical fibers described herein have an attenuation at 1550 nm that is greater than or equal to 0.17 dB/km and less than or equal to 0.182 dB/km. In some embodiments, the optical fibers described herein have an attenuation at 1550 nm that is greater than or equal to 0.17 dB/km and less than or equal to 0.18 dB/km. The optical fibers described herein also have an attenuation at 1310 nm which is less than or equal to 0.34 dB/km, for example less than or equal to 0.32 dB/km.

The optical fibers described herein have a dispersion at 1310 nm of greater than or equal to −1.5 ps/nm/km and less than or equal to 1.5 ps/nm/km. In embodiments, the dispersion at 1310 nm is greater than or equal to −1.0 ps/nm/km and less than or equal to 1.0 ps/nm/km or even greater than or equal to −0.5 ps/nm/km and less than or equal to 0.5 ps/nm/km. In some other embodiments, the dispersion at 1310 nm is greater than or equal to −0.25 ps/nm/km and less than or equal to 0.25 ps/nm/km.

The optical fibers described herein have a dispersion slope at 1310 nm of less than 0.092 ps/nm$^2$/km.

The optical fibers described herein have a dispersion at 1550 nm of less than or equal to 23 ps/nm/km. In some embodiments, the dispersion at 1550 nm is less than or equal to 20 ps/nm/km or even less than or equal to 19 ps/nm/km. In embodiments, the dispersion at 1550 nm is less than or equal to 23 ps/nm/km or even less than or equal to 17 ps/nm/km.

The optical fibers disclosed herein have a wire mesh covered drum microbend loss at 1550 nm (WMCD at 1550 nm) which is less than or equal to 0.07 dB/km. In some embodiments, the optical fibers described herein have a WMCD at 1550 nm of less than or equal to 0.05 dB/km, such as, for example, greater than or equal to 0.005 dB/km and less than or equal to 0.05 dB/km.

The optical fibers disclosed herein have a pin array bend loss at 1550 nm (pin array at 1550 nm) of less than or equal to 150 dB.

The optical fibers disclosed herein have a lateral load microbend test loss at 1550 nm (LLWM at 1550 nm) of less than or equal to 2 dB/m.

The optical fibers disclosed herein have a cable cutoff of less than or equal to 1530 nm. For example, in some embodiments, the optical fibers described herein have a cable cutoff of less than or equal to 1400 nm or even less than or equal to 1260 nm.

As used herein, MAC number is defined as the mode field diameter at 1310 (nm) divided by the 22 m cable cutoff wavelength (nm). In some embodiments, the refractive index profile further provides a MAC number greater than 6.5 and less than or equal to 8.5. In some preferred embodiments, the refractive index profile of the optical fiber provides a MAC number of greater than or equal to 7, for example greater than 7.2 or greater than 7.5. In some embodiments, the MAC number is greater than or equal to 7.1 and less than or equal to 7.8.

Optical fibers disclosed herein are capable of exhibiting an effective area at 1550 nm which is greater than about 70 microns$^2$, in some embodiments greater than or equal to 75 microns$^2$ and less than or equal to 95 microns$^2$, for example greater than or equal to 80 microns$^2$ and less than or equal to 90 microns$^2$. In some embodiments, the optical mode effective area at 1550 nm is greater than or equal to 82 microns$^2$ and less than or equal to 88 microns$^2$.

Optical fibers disclosed herein are capable of exhibiting an effective area at 1310 nm which is greater than about 55 microns$^2$, in some embodiments greater than or equal to 60 microns$^2$ and less than or equal to 65 microns$^2$, for example greater than or equal to 70 microns$^2$ and less than or equal to 75 microns$^2$. In some embodiments, the optical mode effective area at 1310 nm is greater than or equal to 63 microns$^2$ and less than or equal to 78 microns$^2$.

The optical fibers disclosed herein may be drawn from optical fiber preforms made using conventional manufacturing techniques and using known fiber draw methods and apparatuses, for example, as is disclosed in U.S. Pat. No. 7,565,820, U.S. Pat. No. 5,410,567, U.S. Pat. No. 7,832,675, U.S. Pat. No. 6,027,062, the specifications of which is hereby incorporated by reference.

EXAMPLES

The embodiments described herein will be further clarified by the following examples.

Example 1

Seven optical fiber designs (Example A-Example G) were mathematically modeled to determine the optical properties of the fibers. Each of the optical fibers was modeled with an outer cladding that was up-doped with bromine. Optical fiber Examples A-D were modeled with a structure as depicted in FIGS. 3 and 4. That is, the optical fibers of Examples A-D were modeled with a core portion 102 surrounded by and in direct contact with a low-index trench 106 which, in turn, was surrounded by and in direct contact with the outer cladding 108. The structure and optical properties of the optical fibers of Examples A-D are set forth in Table 1.

TABLE 1

Examples A-D

| Parameter | Example A | Example B | Example C | Example D |
|---|---|---|---|---|
| $\Delta_{Cmax}$ (%) | 0.48 | 0.46 | 0.49 | 0.5 |
| $r_C$ (micron) | 6.91 | 6.6 | 6.6 | 6.7 |
| $\alpha$ | 2 | 2 | 2 | 2 |
| $r_{IC}$ (micron) | 21 | 21.6 | 19 | 19 |
| $r_C/r_{IC}$ | 0.33 | 0.3 | 0.35 | 0.35 |
| $\Delta_T$ (%) | 0 | 0 | 0 | 0 |
| $\Delta_{OC}$ (%) | 0.15 | 0.13 | 0.18 | 0.2 |
| $r_{OC}$ | 62.5 | 62.5 | 62.5 | 62.5 |
| Br concentration (wt %) | 1.2 | 1.04 | 1.44 | 1.6 |
| $V_T$ (% micron$^2$) | 59.4 | 55.2 | 57.1 | 63.2 |
| $\lambda_0$ (nm) | 1303 | 1308 | 1305 | 1303 |
| Dispersion at 1310 nm (ps/nm/km) | 1.37 | 0.881 | 1.19 | 1.36 |
| Dispersion Slope at 1310 nm (ps/nm$^2$/km) | 0.091 | 0.090 | 0.091 | 0.091 |
| Dispersion 1550 nm (ps/nm/km) | 19.2 | 18.6 | 18.8 | 19.0 |
| Dispersion Slope 1550 nm (ps/nm$^2$/km) | 0.062 | 0.061 | 0.061 | 0.061 |
| MFD at 1310 nm (micron) | 9.2 | 9.13 | 9.01 | 9.01 |
| MFD at 1550 nm (micron) | 10.3 | 10.3 | 10.1 | 10.0 |
| LLWM at 1550 nm, dB/m | 0.94 | 1.08 | 1.64 | 1.77 |
| Pin Array at 1550 nm, dB | 37.6 | 46.7 | 104 | 123 |
| Cable Cutoff (nm) | 1217 | 1252 | 1243 | 1259 |
| MAC # | 7.56 | 7.29 | 7.25 | 7.16 |
| Attenuation at 1550 nm (dB/km) | <0.185 | <0.185 | <0.185 | <0.185 |
| Attenuation at 1310 nm (dB/km) | <0.325 | <0.325 | <0.325 | <0.325 |
| 1 × 10 mm diameter bend loss, at 1550 nm, (dB/turn) | 0.82 | 0.4 | 0.57 | 0.45 |
| 1 × 15 mm diameter bend loss, at 1550 nm, (dB/turn) | 0.22 | 0.097 | 0.147 | 0.12 |
| 1 × 20 mm diameter bend loss, at 1550 nm, (dB/turn) | 0.06 | 0.024 | 0.038 | 0.032 |
| 1 × 30 mm diameter bend loss, at 1550 nm, (dB/turn) | 0.012 | 0.003 | 0.006 | 0.007 |

Optical fiber Examples E-G were modeled with a structure as depicted in FIGS. 1 and 2. That is, the optical fibers of Examples E-G were modeled with a core portion 102 surrounded by and in direct contact with an inner cladding 104 which, in turn, was surrounded by and in direct contact with a low-index trench 106. Similarly, the low-index trench 106 was surrounded by and in direct contact with the outer cladding 108. The structure and optical properties of the optical fibers of Examples E-G are set forth in Table 2.

TABLE 2

Examples E-G

| Parameter | Example E | Example F | Example G |
|---|---|---|---|
| $\Delta_{Cmax}$ (%) | 0.47 | 0.47 | 0.45 |
| $r_C$ (micron) | 4.3 | 4.3 | 4.3 |
| $\alpha$ | 20 | 20 | 20 |
| $\Delta_{IC}$ (%) | 0.15 | 0.15 | 0.15 |
| $\Delta_C - \Delta_{IC}$ | 0.32 | 0.32 | 0.30 |
| $r_{IC}$ (micron) | 10 | 9 | 8.1 |
| $r_{IC}/r_C$ | 2.3 | 2.1 | 1.9 |
| $\Delta_T$ (%) | 0.00 | 0.00 | 0.00 |
| $\Delta_{IC} - \Delta_C$ | 0.15 | 0.15 | 0.15 |
| $r_T$ (micron) | 20 | 19.5 | 20 |
| $\Delta_{OC}$ (%) | 0.15 | 0.15 | 0.15 |
| $r_{OC}$ (micron) | 62.5 | 62.5 | 62.5 |
| Max. Br (wt. %) | 1.2 | 1.2 | 1.2 |
| $\Delta_{OC} - \Delta_T$ | 0.15 | 0.15 | 0.15 |
| $V_T$ (% micron$^2$) | 45 | 45 | 50 |
| Dispersion at 1310 nm (ps/nm/km) | 4.9E−04 | 0.346 | 0.25 |
| Dispersion Slope at 1310 nm (ps/nm$^2$/km) | 0.088 | 0.099 | 0.091 |
| $\lambda_0$, (nm) | 1318 | 1315 | 1315 |
| Dispersion at 1550 nm (ps/nm/km) | 17.5 | 18 | 18 |
| Dispersion at Slope 1550 nm (ps/nm$^2$/km) | 0.062 | 0.062 | 0.063 |
| MFD at 1310 nm (micron) | 9.2 | 9.16 | 9.25 |
| MFD at 1550 nm (micron) | 10.4 | 10.3 | 10.4 |
| LLWM @ 1550 nm, (dB/m) | 0.6 | 0.56 | 0.77 |
| WMCD at 1550 nm, (dB/km) | 0.04 | 0.04 | 0.04 |
| Pin Array at 1550 nm (dB) | 14.9 | 15.0 | 23.9 |
| Cable Cutoff (nm) | 1206 | 1206 | 1200 |
| Aeff at 1310 nm (micron$^2$) | 66.5 | 65.9 | 67.2 |
| Aeff at 1550 nm (micron$^2$) | 85.6 | 84.0 | 84.6 |

TABLE 2-continued

Examples E-G

| Parameter | Example E | Example F | Example G |
|---|---|---|---|
| MAC # | 7.63 | 7.60 | 7.71 |
| 1 × 15 mm diameter bend loss at 1550 nm (dB/turn) | 0.19 | 0.2 | 0.29 |
| 1 × 20 mm diameter bend loss at 1550 nm (dB/turn) | 0.047 | 0.047 | 0.074 |
| 1 × 30 mm diameter bend loss at 1550 nm (dB/turn) | 0.0045 | 0.0045 | 0.01 |
| Attn at 1550 nm, (dB/km) | 0.18 | 0.18 | 0.18 |
| Attn at 1310 nm, (dB/km) | 0.32 | 0.32 | 0.32 |

As set forth in Tables 1 and 2, the optical fibers of modeled Examples A-G are G.652 compliant. That is, the optical fibers have mode field diameters (MFD) greater than 9 microns and less than 9.5 microns at a wavelength of 1310 nm, cable cutoff wavelengths of less than 1260 nm and greater than 1000 nm, attenuation at 1550 nm of less than or equal to 0.185 dB/km, and a zero dispersion wavelength $\lambda_0$ greater than or equal to 1300 nm and less than or equal to 1324 nm. The optical fibers also exhibit macrobend losses of less than 0.5 dB/turn at 1550 nm when wound around a 15 mm diameter mandrel indicating enhanced bend performance.

As described herein, forming the optical fibers with bromine in the outer cladding, as opposed to chlorine for example, decreases the stress that develops in regions of the optical fiber directly adjacent to the core. To assess the relative decrease in axial stress, the axial stress was calculated for each region outside of the core portion of the optical fiber in each of Examples A-G. For purposes of comparison, seven comparative optical fiber designs (Comparative Examples 1-7) were modeled. The Comparative Examples were modeled with the same dimensions and relative refractive indexes as Examples A-G, but with chlorine as the up-dopant in the outer cladding rather than bromine. The axial stress was also calculated for each region outside of the core portion of the optical fiber in each of Comparative Examples 1-7. Comparative Example 1 corresponds to Example A, Comparative Example 2 corresponds to Example B, and so forth. The axial stress data for Examples A-D and Comparative Examples 1-4 is set forth in Table 3. The axial stress data for Examples E-F and Comparative Examples 5-7 is set forth in Table 4.

TABLE 3

Axial Stress for Examples A-D and Comparative Examples 1-4

| | Ex. A | Comp. Ex. 1 | Ex. B | Comp. Ex. 2 | Ex. C | Comp. Ex. 3 | Ex. D | Comp. Ex. 4 |
|---|---|---|---|---|---|---|---|---|
| Axial Stress in Low-Index Trench (MPa) | 1.5 | 7.18 | 1.5 | 5.9 | 1.9 | 9.08 | 2.27 | 11.1 |
| Axial Stress in Outer Cladding (MPa) | −0.211 | −0.883 | −0.211 | −0.782 | −0.275 | −1.19 | −0.242 | −1.06 |

TABLE 4

Axial Stress for Examples E-F and Comparative Examples 5-7

| | Ex. E | Comp. Ex. 5 | Ex. F | Comp. Ex. 6 | Example G | Comp. Ex. 7 |
|---|---|---|---|---|---|---|
| Axial Stress in Inner Cladding (MPa) | 0.451 | 3.61 | 0.464 | 3.64 | 0.466 | 3.59 |
| Axial Stress in Low-Index Trench (MPa) | 1.56 | 7.48 | 1.56 | 7.52 | 1.54 | 7.42 |
| Axial Stress in Outer Cladding (MPa) | −0.186 | −0.763 | −0.181 | −0.732 | −0.189 | −0.78 |

As shown in Tables 3 and 4, up-doping the outer cladding with bromine resulted in lower stresses in the regions directly adjacent to the core portion of the optical fiber compared to optical fibers in which the outer cladding was up-doped with chlorine. For example, Table 3 shows that the low-index trenches (i.e., the regions directly adjacent to the core portion) of the bromine doped optical fibers of Examples A-D had axial stresses of less than 2.5 MPa while the low-index trenches of the chlorine doped optical fibers of Comparative Examples 1-4 had axial stresses greater than 5 MPa. As discussed herein, reducing the axial stress in the regions of the optical fiber adjacent to the core portion reduces attenuation in the core portion of the optical fiber. The data of Table 3 also shows that the magnitude (i.e., the absolute value) of the axial stress in the outer claddings of Examples A-D was lower than the magnitude of axial stress in the outer claddings of Comparative Examples 1-4.

Similarly, Table 4 shows that the inner claddings (i.e., the regions directly adjacent to the core portion) of the bromine doped optical fibers of Examples E-F had axial stresses of less than 0.5 MPa while the inner claddings of the chlorine doped optical fibers of Comparative Examples 5-7 had axial stresses greater than 3 MPa. As discussed herein, reducing the axial stress in the regions of the optical fiber adjacent to the core portion reduces attenuation in the core portion of the optical fiber. The data of Table 4 also shows that the magnitude (i.e., the absolute value) of the axial stress in the low-index trenches and outer claddings of Examples E-F was lower than the magnitude of axial stress in the low-index trenches and outer claddings of Comparative Examples 5-7.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising:
   a core portion comprising an outer radius $r_C$ and a maximum relative refractive index $\Delta_{Cmax}$ relative to pure silica glass;
   a cladding surrounding the core portion and comprising:
      a low-index trench surrounding the core portion, the low-index trench comprising an outer radius $r_T$ and relative refractive index $\Delta_T$ relative to pure silica glass; and
      an outer cladding surrounding and in direct contact with the low-index trench, the outer cladding formed from silica-based glass comprising greater than 1.0 wt. % bromine and having a relative refractive index $\Delta_{OC}$ relative to pure silica glass, wherein:
         the optical fiber comprises a cable cutoff of less than or equal to 1530 nm;
         $\Delta_{Cmax} > \Delta_{OC} > \Delta_T$; and
         an attenuation of the optical fiber is less than or equal to 0.185 dB/km at a wavelength of 1550 nm.

2. The optical fiber of claim 1, wherein a mode field diameter MFD of the optical fiber is greater than 9 μm at a wavelength of 1310 nm.

3. The optical fiber of claim 1, wherein a 15 mm diameter bend loss of the optical fiber is less than 0.5 dB/turn at 1550 nm.

4. The optical fiber of claim 1, wherein a cable cutoff of the optical fiber is less than 1260 nm.

5. The optical fiber of claim 1, wherein a zero dispersion wavelength $\lambda_0$ of the optical fiber is greater than or equal to 1300 nm and less than or equal to 1324 nm.

6. The optical fiber of claim 1, wherein a concentration of bromine in the outer cladding is less than or equal to 3 wt. %.

7. The optical fiber of claim 1, wherein a concentration of bromine in the outer cladding is greater than or equal to 1.2 wt. % and less than or equal to 2.0 wt. %.

8. The optical fiber of claim 1, wherein $\Delta_{OC}$ is greater than or equal to 0.1% and less than or equal to 0.4% relative to pure silica glass.

9. The optical fiber of claim 1, wherein the low-index trench has a volume profile $V_T$ and $|V_T|$ is greater than or equal to 30% $\Delta\mu m^2$.

10. The optical fiber of claim 1, wherein the low-index trench is in direct contact with the core portion.

11. The optical fiber of claim 10, wherein the core portion has an alpha profile and a is greater than or equal to 1 and less than or equal to 5.0.

12. The optical fiber of claim 10, wherein:
   the outer radius $r_C$ of the core portion is greater than or equal to 4 microns and less than or equal to 10 microns; and
   the outer radius $r_T$ is greater than or equal to 14 microns and less than or equal to 25 microns.

13. The optical fiber of claim 1, wherein the cladding further comprises an inner cladding surrounding the core portion and in direct contact with the core portion and the low-index trench, the inner cladding comprising an outer radius $r_{IC}$ and a relative refractive index $\Delta_{IC}$ relative to pure silica glass, wherein $\Delta_{max} > \Delta_{IC}$ and $\Delta_{IC} > \Delta_T$.

14. The optical fiber of claim 13, wherein the core portion has an alpha profile and a is greater than or equal to 10.

15. The optical fiber of claim 13, wherein:
   the outer radius $r_C$ of the core portion is greater than or equal to 2.75 microns and less than or equal to 6 microns;
   the outer radius $r_{IC}$ of the inner cladding is greater than or equal to 6.5 microns and less than or equal to 15 microns; and
   the outer radius $r_T$ is greater than or equal to 12 microns and less than or equal to 25 microns.

16. An optical fiber comprising:
   a core portion comprising an outer radius $r_C$ and a maximum relative refractive index $\Delta_{Cmax}$ relative to pure silica glass;
   a cladding surrounding the core portion and comprising:
      a low-index trench surrounding the core portion, the low-index trench comprising an outer radius $r_T$ and relative refractive index $\Delta_T$ relative to pure silica glass; and
      an outer cladding surrounding and in direct contact with the low-index trench, the outer cladding formed from silica-based glass comprising greater than 0.25 wt. % of bromine or a compound of bromine and having a relative refractive index $\Delta_{OC}$ relative to pure silica glass, wherein:
         the optical fiber comprises a cable cutoff less than or equal to 1530 nm;
         $\Delta_{Cmax} > \Delta_{OC} > \Delta_T$; and
         an axial stress of a region directly adjacent to the core portion is less than 2.5 MPa.

17. The optical fiber of claim 16, wherein a mode field diameter MFD of the optical fiber is greater than 9 μm at a wavelength of 1310 nm.

18. The optical fiber of claim 16, wherein a 15 mm diameter bend loss of the optical fiber is less than 0.5 dB/turn at 1550 nm.

19. The optical fiber of claim 16, wherein a cable cutoff of the optical fiber is less than 1260 nm.

20. The optical fiber of claim 16, wherein a zero dispersion wavelength $\lambda_0$ of the optical fiber is greater than or equal to 1300 nm and less than or equal to 1324 nm.

21. The optical fiber of claim 16, wherein the low-index trench is in direct contact with the core portion.

22. The optical fiber of claim 21, wherein the core portion has an alpha profile and a is greater than or equal to 1 and less than or equal to 5.0.

23. The optical fiber of claim 21, wherein:
   the outer radius $r_C$ of the core portion is greater than or equal to 4 microns and less than or equal to 10 microns; and
   the outer radius $r_T$ is greater than or equal to 14 microns and less than or equal to 25 microns.

24. The optical fiber of claim 16, wherein the cladding further comprises an inner cladding surrounding the core portion and in direct contact with the core portion and the low-index trench, the inner cladding comprising an outer radius $r_{IC}$ and a relative refractive index $\Delta_{IC}$ relative to pure silica glass, wherein $\Delta_{Cmax} > \Delta_{IC}$ and $\Delta_{IC} > \Delta_T$.

25. The optical fiber of claim 24, wherein the core portion has an alpha profile and a is greater than or equal to 10.

26. The optical fiber of claim 24, wherein:
   the outer radius $r_C$ of the core portion is greater than or equal to 2.75 microns and less than or equal to 7 microns;
   the outer radius $r_{IC}$ of the inner cladding is greater than or equal to 6.5 microns and less than or equal to 15 microns; and
   the outer radius $r_T$ is greater than or equal to 12 microns and less than or equal to 25 microns.

* * * * *

UNITED STATES PATENT AND TRADEMARK OFFICE
CERTIFICATE OF CORRECTION

PATENT NO. : 10,215,915 B2
APPLICATION NO. : 15/714122
DATED : February 26, 2019
INVENTOR(S) : Dana Craig Bookbinder et al.

Page 1 of 1

It is certified that error appears in the above-identified patent and that said Letters Patent is hereby corrected as shown below:

In the Claims

In Column 25, Line 66, Claim 11, delete "a is" and insert -- $\alpha$ is --, therefor.

In Column 26, Line 12, Claim 13, delete "$\Delta_{max}$" and insert -- $\Delta_{Cmax}$ --, therefor.

In Column 26, Line 14, Claim 14, delete "a is" and insert -- $\alpha$ is --, therefor.

In Column 26, Line 58, Claim 22, delete "a is" and insert -- $\alpha$ is --, therefor.

In Column 26, Line 58, Claim 22, delete "land" and insert -- 1 and --, therefor.

In Column 27, Line 6, Claim 25, delete "a is" and insert -- $\alpha$ is --, therefor.

Signed and Sealed this
Twenty-ninth Day of October, 2019

Andrei Iancu
*Director of the United States Patent and Trademark Office*